April 20, 1926.
H. L. COOK
1,581,679
DEMOUNTABLE RIM
Filed Dec. 4, 1924
2 Sheets-Sheet 1
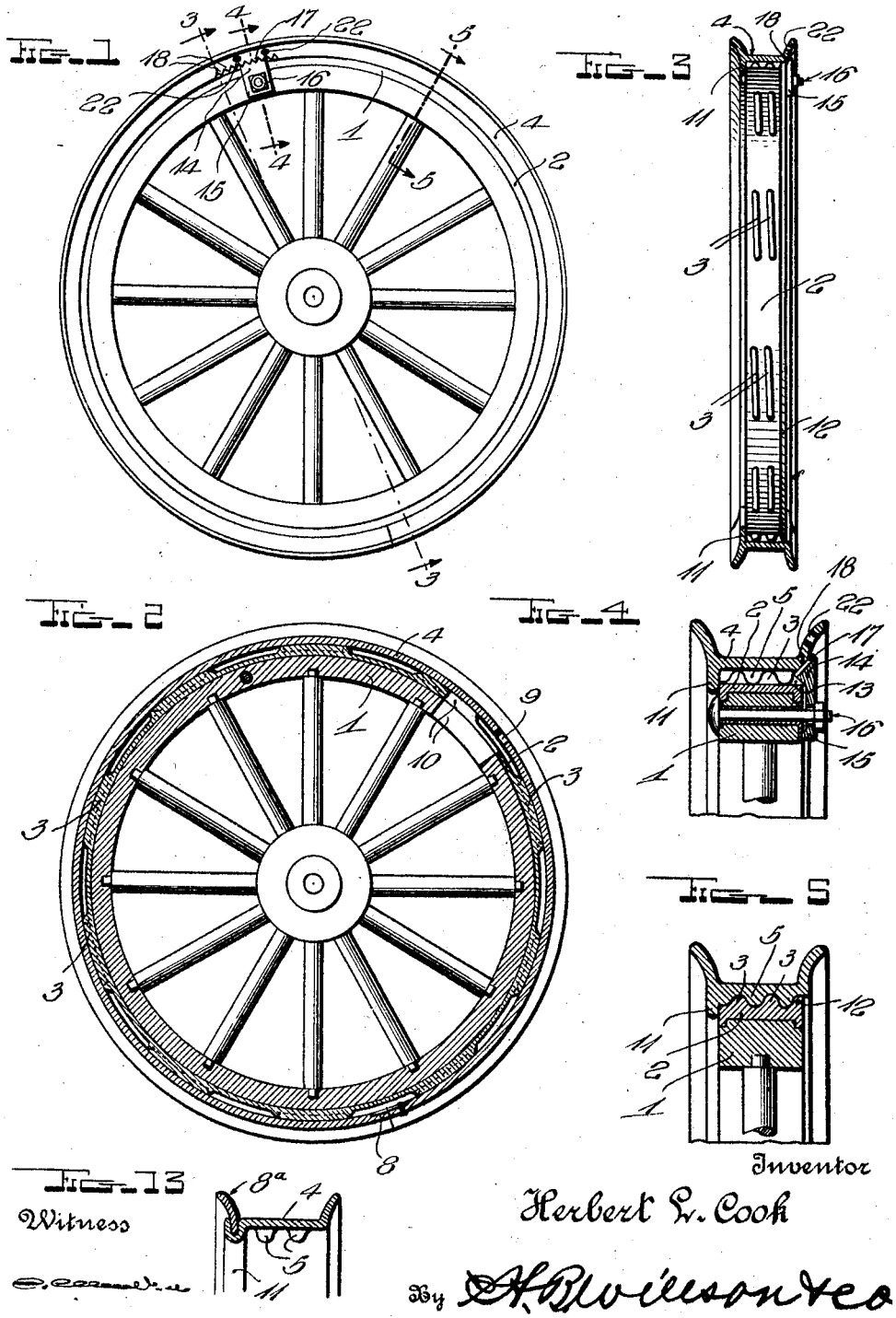
Inventor
Herbert L. Cook April 20, 1926.
H. L. COOK
1,581,679
DEMOUNTABLE RIM
Filed Dec. 4, 1924
2 Sheets-Sheet 2
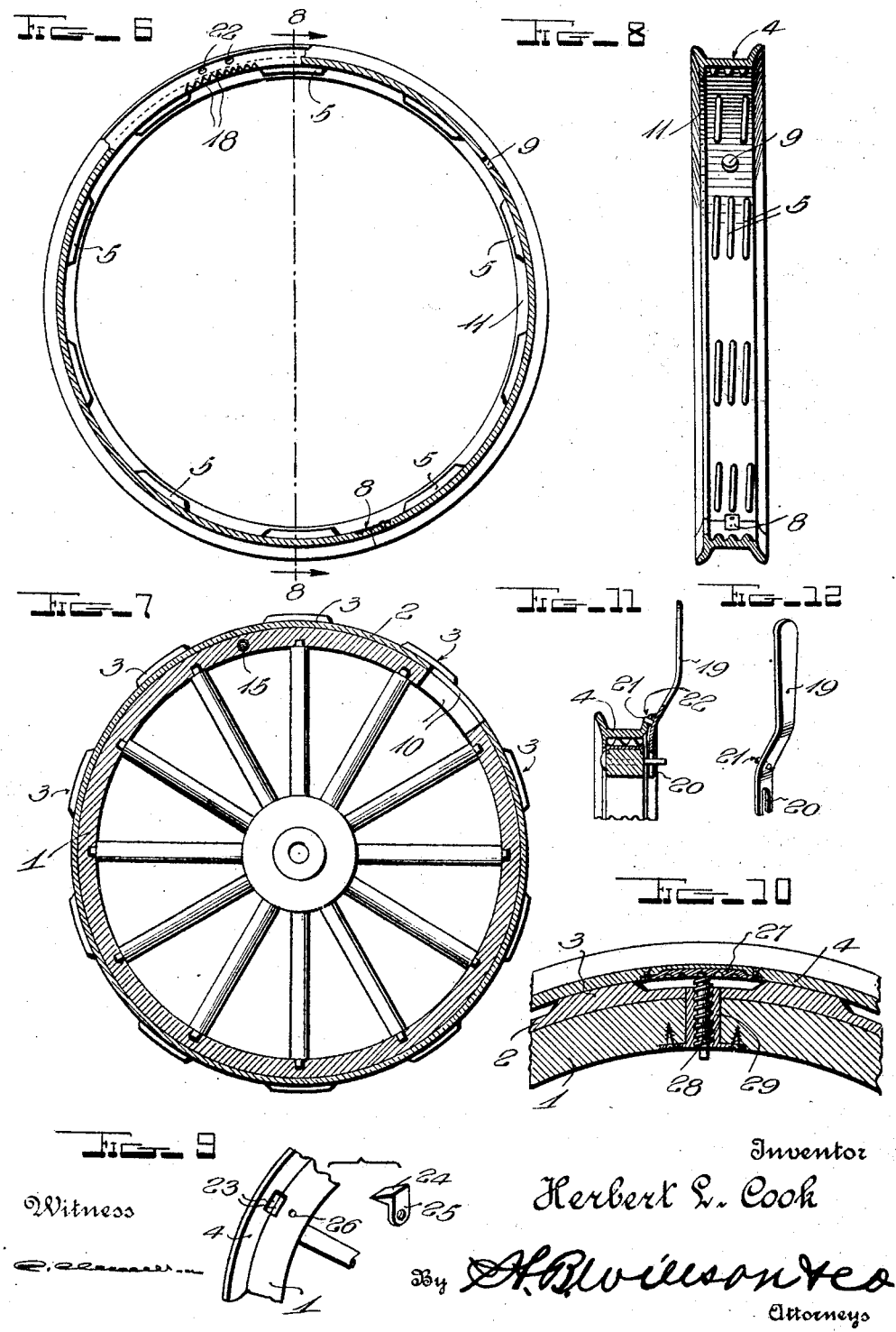
Inventor
Herbert L. Cook Patented Apr. 20, 1926.

1,581,679

UNITED STATES PATENT OFFICE.

HERBERT L. COOK, OF SOUTH LA GRANGE, MAINE.

DEMOUNTABLE RIM.

Application filed December 4, 1924. Serial No. 753,956.

*To all whom it may concern:*

Be it known that I, HERBERT L. COOK, a citizen of the United States, residing at South La Grange, in the county of Penobscot and State of Maine, have invented certain new and useful Improvements in Demountable Rims; and I do declare the following to be a full, clear, and exact description of the invention, such as will enable others skilled in the art to which it appertains to make and use the same.

My invention relates to means for locking a demountable rim upon a wheel felly by turning the rim circumferentially upon the felly, and its object is to provide unique means for locking the rim in operative position upon the wheel.

With the foregoing in view, the invention resides in the novel subject matter hereinafter described and claimed, the description being supplemented by the accompanying drawings.

Figure 1 is a side elevation of a wheel equipped with the improved demountable rim and locking means for the latter.

Figure 2 is a vertical sectional view cut in a central plane between opposite sides of the wheel.

Figure 3 is a vertical transverse sectional view on line 3—3 of Fig. 1, the wheel being shown in edge view.

Figures 4 and 5 are enlarged detail transverse sectional views as indicated by lines 4—4 and 5—5 of Fig. 1.

Figure 6 is a vertical sectional view of the demountable rim, partly in elevation.

Figure 7 is a similar view of the wheel.

Figure 8 is a vertical sectional view on line 8—8 of Fig. 6.

Figure 9 is a detail view showing a different manner of locking the rim on the wheel.

Figure 10 is a detail sectional view showing a still further way of holding the rim against turning on the wheel.

Figure 11 is a detail transverse section, partly in elevation, illustrating the use of the tool for circumferentially turning the rim with respect to the felly.

Figure 12 is a perspective view of the tool shown in Fig. 11.

Figure 13 is a detail section of a form of rim which may be used if desired.

In the drawings above briefly described, a wheel is shown having a felly 1 provided with a metal felly band 2 which is secured thereto in any desired manner. The outer peripheral side of this band, is provided with groups 3 of ribs, these groups being circumferentially spaced apart. Each group comprises a plurality of parallel circumferentially extending ribs and said groups are preferably spaced apart uniform distances, the ribs of all groups being pitched in the same manner as screw threads. A demountable rim 4 is provided to surround the felly band 2 and its ribs 3, and the inner side of this rim is provided with circumferentially spaced groups of pitched ribs 5 which correspond to the ribs 3 and are adapted to interlock with the latter when the rim is moved onto the wheel and circumferentially turned with respect to the latter. The two series of ribs 3 and 5 are shown interlocked in Figs. 2 and 5, and it will be seen that when this interlocking takes place, the rim is held against lateral movement from the wheel.

If desired, the rim 4 may be transversely split and provided with any suitable means 8 normally connecting its ends, or it may have a detachable side ring 8ª, as in Fig. 13. The rim is of course provided with the usual valve stem opening 9 which registers with a slot 10 in the felly and felly band, the slot being of a length to permit the necessary circumferential turning of the rim with respect to the wheel, when removing or applying the former. Preferably, one edge of the rim 4 is provided with a continuous inwardly extending flange 11 to abut one edge of the felly band 2, and the opposite edge of this felly band is preferably provided with a projecting rib 12 for reception in an edge portion of the rim. At one point, this rib 12 is interrupted by a notch 13 which receives a portion of the thickened outer end 14 of a lug 15 which is secured against the felly by an appropriate bolt 16. The thickened end of this lug is provided with teeth 17 which engage circumferentially spaced teeth 18 formed on rim 4, at one edge of the latter. When the rim is turned to the maximum regardless of wear, when applying it to the wheel, it will be seen that the teeth 17 will engage certain of the teeth 18, so as to effectively lock the rim and felly together.

For the purpose of relatively turning the rim and felly, when the lug 15 is removed, I prefer to employ a hand lever 19 having a bifurcated end 20 to straddle the bolt 16 as shown in Fig. 11, said lever having a lateral pin 21 for reception in any of a plurality of openings 22 which are formed in one flange of the rim. With the lever 19 positioned as shown in Fig. 11, it will be seen that it may be effectively used for relatively turning the rim and felly to either apply or remove the former.

Figure 9 illustrates a different form of construction which may be employed to lock the rim 4 against circumferential movement on the felly band 2. In this view, the band and rim are formed with registering recesses 23 which are adapted to receive a locking wedge 24 carried by a lug 25, this being adapted to be secured to the wheel felly, by a bolt or the like 26.

Figure 10 discloses a still further detail which may, if desired, be employed to hold the rim against circumferential movement on the felly. In this view, 27 designates a socketed plate integral with or otherwise secured to the inner side of the rim 4 for engagement with the outer end of a screw 28 which is threaded through an appropriate guide 29 passing through the felly and the felly band of the wheel.

By providing the construction shown and described or a substantial equivalent thereof, it will be seen that the rim may be quickly and easily applied to or removed from the wheel, whenever necessary. As excellent results are obtainable from the general constructions disclosed, they may well be followed, but within the scope of the invention as claimed, modifications may of course be made.

I claim:

In a wheel having interlocking connecting means between its felly and rim controlled by relative turning of said felly and rim; circumferentially spaced closely related teeth on the inner side of the rim at one edge of the latter, a lug contacting with the adjacent side of the felly and having a thickened outer end provided with teeth meshing with the aforesaid teeth, said felly having a recess receiving a portion of said thickened outer end of said lug, and a bolt detachably securing said lug to the felly.

In testimony whereof I have hereunto affixed my signature.

HERBERT L. COOK.